Oct. 27, 1959   L. MARTIN   2,910,624
CONTROL CIRCUIT
Filed May 9, 1955

INVENTOR.
LYLE MARTIN
BY
Robert C. Smith
ATTORNEY

United States Patent Office 2,910,624
Patented Oct. 27, 1959

2,910,624

CONTROL CIRCUIT

Lyle Martin, South Bend, Ind., assignor to Bendix Aviation Corporation, South Bend, Ind., a corporation of Delaware Application May 9, 1955, Serial No. 506,827

8 Claims. (Cl. 317—5)

This invention relates to control circuits and more specifically to a circuit for controlling the introduction of a particular limiting function into a mixing section of a magnetic amplifier, especially where the amplifier is used in a fuel control for gas turbine engines.

The invention described herein is particularly applicable to a system wherein the fuel to the engine is limited as a function of a particular engine operating parameter over a specified speed range. The terms "engine operating parameter" or "parameter" are used herein to refer generally to any of a number of operating conditions affecting output of the engine such as rotational speed, acceleration, compressor discharge pressure, ambient temperature, etc. When the maximum boundary of this range has been reached, it becomes necessary to suddenly or progressively remove the signal which is representative of this parameter. It is, therefore, an object of the present invention to provide a means which can sense the maximum bounds of the acceleration range over which a limiting function is desired to be maintained, and switch said limiting function out of the control so that this function has no further effect or a progressively diminishing effect on acceleration above this speed point.

It is another object of the present invention to provide a switching means which will accomplish the above object and which is easily adjusted to conform to the operating characteristics of a number of different engines.

It is another object of the present invention to provide a switching means which will accomplish the above objects and which is relatively simple and free from fragile components.

Figure 1:
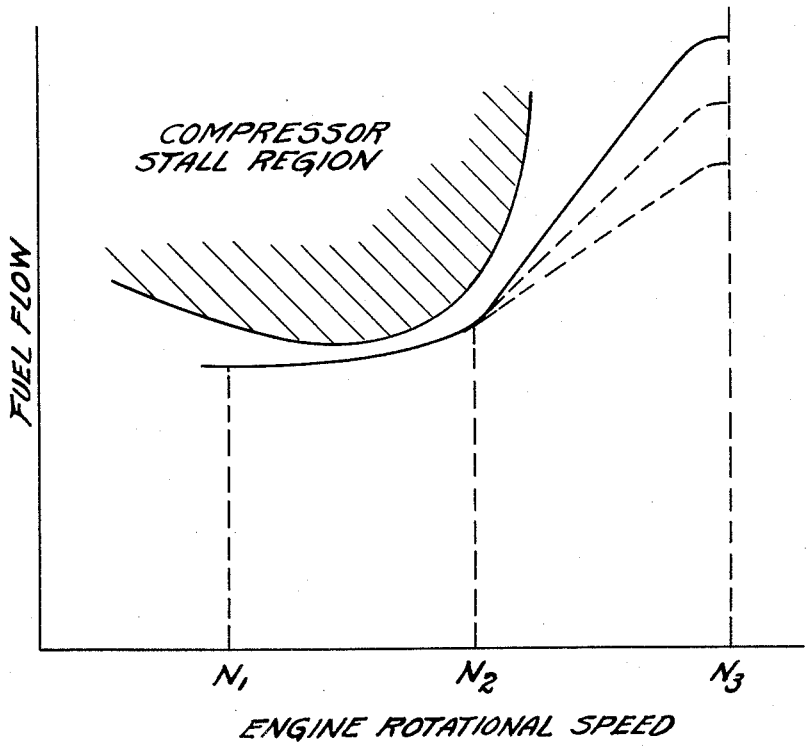
Figure 2:
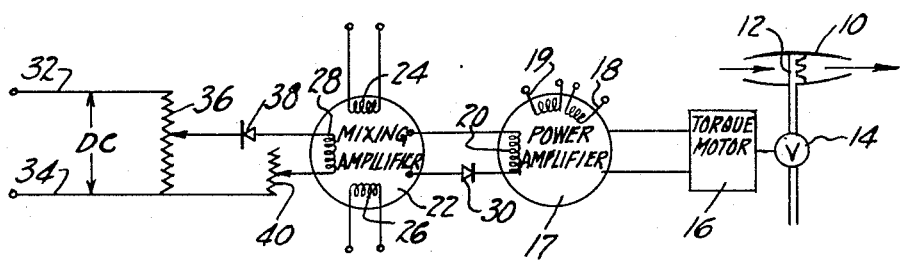

Other objects and advantages will become apparent from the following specification and drawings in which:

Figure 1 is a graph which shows an acceleration schedule for a gas turbine engine having a fuel control embodying my invention; and Figure 2 is a schematic drawing of an electrical fuel control system in which my invention is embodied.

With reference to Figure 1, it will be observed that this figure is a graph in which fuel flow is plotted against turbine rotational speed. As the engine is accelerated along the solid line from speed $N_1$ to speed $N_2$ the acceleration is limited by some control factor which may be simply a linear function of the acceleration. The shaded area shown on this graph is representative of the compressor stall region which must be avoided because of the danger of damage to the engine. When the danger of running into this area has passed, the rate of fuel flow may safely be increased thereby providing for a greatly increased acceleration. This is indicated by the portion of the schedule between speed $N_2$ and speed $N_3$ which shows a sharply increased fuel flow. My invention is particularly concerned with a means for producing a control function which can provide this sharp increase after a speed has been reached where it may be used safely.

Referring now to Figure 2, numeral 10 represents a gas turbine engine having a manifold 12 which is supplied with a fuel flow variable through the action of a valve 14. Operation of this valve is controlled by a torque motor 16 which receives a control signal from a power amplifier 17. The power amplifier is supplied with a plurality of signals 18, 19, 20 representative of various control functions. The function which is directly involved in the present specification is introduced into the power amplifier by means of winding 20. The signal on this winding is a resultant signal produced in a mixing amplifier 22 through the combined action of a speed rate signal winding 24, a speed rate reference winding 26, and a speed signal winding 28. As mentioned above, this particular specification assumes that primary control of fuel flow over at least a portion of the acceleration schedule will be as a linear function of acceleration. It could be controlled on any one of several other parameters such as combustion gas temperature. The speed rate and acceleration reference signals may be produced by well known differentiating and voltage dividing techniques, respectively. The system is designed so that in the absence of any signal on winding 28 the signals appearing on windings 24 and 26 are compared in the mixing amplifier 22 and any resultant signal, which is representative of an acceleration exceeding the desired rate is supplied to the power amplifier 17 and hence, to the torque motor 16 and the valve 14. This signal is of a polarity such as to call for reduced fuel flow. Should the acceleration be below the rate permitted by the reference appearing on winding 26, the output of the mixer amplifier 22 would be of such polarity as to be blocked by means of a rectifier 30 and therefore there would be no acceleration limit on fuel flow. In such case the fuel flow would increase until limited by one of the control functions appearing on the other signal windings 18, 19 in the power amplifier 17, or until the acceleration reference calls for a reduced flow, whichever occurs first.

The manner in which this control acts to produce a sharply increased fuel flow after the engine reaches a desired speed $N_2$ is as follows: Impressed on terminals 32 and 34 is a direct current voltage which is directly variable with engine rotational speed. A portion of this voltage is selected by means of a potentiometer 36 and thereafter is impressed across winding 28. A rectifier 38 is inserted in the circuit of winding 28 in such manner as to oppose the speed signal selected by means of potentiometer 36. Also connected to winding 28 is a variable resistor 40. The rectifier 38 is a silicon diode or diode of material having similar properties such that it offers a very high resistance in the opposing direction until a specified voltage is reached. (This is called Zener voltage.) At this voltage the resistance drops to a relatively low value and comparatively large amounts of current will begin to flow. By proper setting of potentiometer 36, the voltage for reverse conduction of rectifier 38 can be made to correspond to the desired speed $N_2$. Below speed $N_2$ the speed rate signal on winding 24 limits fuel flow through the mixer amplifier 22, winding 20 in power amplifier 17 and torque motor 16 with rectifier 30 conducting. When speed $N_2$ is reached, rectifier 38 conducts due to zener current and the resulting signal appearing on winding 28 exceeds the acceleration signal on winding 24, thereby reversing the polarity of the output of mixer amplifier 22 and maintaining the polarity such that, irrespective of changes in the acceleration signal, the output of the amplifier is blocked by means of rectifier 30. The fuel flow to the engine is subsequently limited only by the other signals appearing in the power amplifier 17. The resistor 40, it will be observed, varies the amount of current flowing through winding 28 and thereby provides a means for varying the rate at which the acceleration signal is attenuated. The effect of adjusting this potentiometer to different values may be seen by referring to Figure 1 wherein the portion of the curve from speed $N_2$ to speed $N_3$ is shown, by means of the dotted lines, to have alternate patterns corresponding to different fuel flow rates resulting from different degrees of attenuation of the acceleration signal. It is desirable that the potentiometer 36 and the resistor 40 be adjustable in order to vary the speed $N_2$ and the slope of the fuel flow vs. speed curve beyond speed $N_2$ because of the fact that engines differ in the shape and position of their compressor stall patterns. One engine may require that speed $N_2$ be selected corresponding to a high r.p.m., but permitting fuel flow to be increased very rapidly beyond said speed; while another may be best served by selecting a comparatively low value of speed $N_2$ and restricting the fuel flow somewhat at speed values above $N_2$.

Although my invention has been described herein in connection with a particular embodiment, it will be understood that it is applicable to a wide range of different applications.

I claim:

1. In a fuel control system for gas turbine engines comprising a valve, a torque motor driving said valve, and a magnetic amplifier supplying an input signal to said torque motor, said magnetic amplifier having a stage of power amplification containing a plurality of winding each of which carries a control signal, a mixing stage for producing a signal to be impressed upon one of said control windings, a rectifier positioned between said mixing stage and said one control winding and connected so as to conduct only signals representative of excessive values of a desired control parameter, a winding in said mixing stage carrying a signal responsive to instantaneous values of said control parameter, means producing a reference signal against which said control parameter signal is compared to provide an error signal, and means producing a speed signal capable of overriding said error signal comprising a potentiometer across which a signal responsive to engine rotational speed is impressed, a dry rectifier having zener characteristics connected in series with the slider on said potentiometer in such manner that voltages representative of engine rotational speeds below a predetermined value are blocked and those representative of speeds above said value are conducted across said rectifier, a signal winding in said mixing stage in series with said slider and said rectifier, and a variable resistor connected on the opposite side of said signal winding from said rectifier.

2. In a fuel system for gas turbine engines comprising a valve, a torque motor driving said valve, and a magnetic amplifier powering said torque motor, said magnetic amplifier having a stage of power amplification containing a plurality of windings each of which carries a limiting control signal, a mixing stage for producing one of said signals to be impressed on one of said control windings, a rectifier positioned between said mixing stage and said one control winding and connected so as to conduct only signals representative of excessive values of a desired control parameter, a winding in said mixing stage carrying a signal responsive to instantaneous values of said control parameter, means producing a reference signal against which said signal is compared to provide an error signal, and means producing a signal capable of overriding said error signal comprising a potentiometer across which a signal responsive to a second control parameter is impressed, a signal winding in said mixing stage connected in parallel with said potentiometer output, a zener diode connected between said potentiometer and said signal winding in such manner that signals representative of values of said second parameter below a predetermined value are blocked and those representative of values of said second parameter above said predetermined value are conducted across said diode, and a variable resistor connected on the opposite side of said signal winding from said diode.

3. In a magnetic amplifier for use with a gas turbine fuel system wherein a plurality of control parameters are introduced as limiting functions on their respective inductively related control windings, a circuit for switching one of said parameters out of said system upon the arrival of a second parameter at a specified value, comprising a potentiometer across which a signal responsive to said second parameter is impressed, a dry rectifier having zener characteristics connected in series with the slider on said potentiometer in such manner that voltages representative of engine rotational speeds below a predetermined value are blocked and those representative of speeds above said value are conducted across said rectifier is in the non-conducting direction, a signal winding in series with said slider and said rectifier, and a variable resistor connected on the opposite side of said signal winding from said rectifier.

4. In a magnetic amplifier for use with a gas turbine fuel system wherein a plurality of control parameters are introduced as limiting functions on their respective inductively related control windings, a circuit for switching one of said parameters out of said system as a function of engine rotational speed comprising a potentiometer across which a signal responsive to engine rotational speed is impressed, a dry rectifier having zener characteristics connected in series with the slider on said potentiometer in such manner that voltages representative of engine rotational speeds below a predetermined value blocked and those representative of speeds above said value are conducted across said rectifier, a signal winding in series with said slider and said rectifier, and a variable resistor connected on the opposite side of said signal winding from said rectifier.

5. In a magnetic amplifier for use with a gas turbine fuel control system wherein fuel feed is limited as a function of acceleration during transient engine operating conditions, means including signal windings for producing an acceleration error signal, means producing a signal varying directly with engine rotational speed, and means using said speed signal to progressively override said acceleration error signal including a potentiometer across which said speed signal is impressed, a signal winding inductively related to the aforesaid signal windings connected in parallel with said potentiometer, a zener diode connected in series with said winding in such manner that voltages representative of engine rotational speeds below a predetermined value are blocked and those representative of speeds above said value are conducted across said diode, and a variable resistor connected on the opposite side of said signal winding from said diode.

6. In a magnetic amplifier wherein signals representative of each of a plurality of control parameters are introduced on their respective inductively related control windings, a circuit for switching a signal representing error values of one of said parameters out of said amplifier output upon the arrival of a second parameter at a specified value comprising a potentiometer across which a signal responsive to said second parameter is impressed, a signal winding connected in parallel with said potentiometer output, a zener diode connected between said potentiometer and said signal winding in such manner that signals representative of values of said second parameter below a predetermined value are blocked and those representative of values of said second parameter above said predetermined value are conducted across said diode.

7. In a magnetic amplifier wherein signals representative of each of a plurality of control parameters are introduced on their respective inductively related control windings, a circuit for switching a signal representing error values of one of said parameters out of said amplifier output upon the arrival of a second parameter at a specified value comprising means producing a signal proportional to said second parameter, a winding across which said signal is impressed inductively related to the aforesaid control windings, a zener diode connected in series in said winding in such manner that signals representative of values of said second parameter below a predetermined value are blocked and those representative of values of said second parameter above said predetermined value are conducted across said diode, and a variable resistor connected on the opposite side of signal winding from said diode.

8. In a fuel control system for gas turbine engines comprising a valve, a torque motor driving said valve, and a magnetic amplifier supplying an input signal to said torque motor, said magnetic amplifier having a stage of power amplification containing a plurality of windings each of which carries a control signal, a mixing stage for producing a signal to be impressed upon one of said control windings, a rectifier positioned between said mixing stage and said one control winding and connected so as to conduct only signals representative of excessive values of speed or acceleration, a winding in said mixing stage carrying a signal responsive to instantaneous values of engine rotational acceleration, means producing an acceleration reference signal against which said acceleration signal is compared to provide an acceleration error signal, and means producing a speed signal capable of overriding said acceleration error signal comprising a potentiometer across which a signal responsive to engine rotational speed is impressed, a dry rectifier having zener characteristics connected in series with the slider on said potentiometer in such a manner that voltages representative of engine rotational speeds below a predetermined value are blocked and those representative of speeds above said value are conducted across said rectifier, a signal winding in said mixing stage in series with said slider on said rectifier, and a variable resistor connected on the opposite side of said signal winding from said rectifier.

References Cited in the file of this patent

UNITED STATES PATENTS

| | | |
|---|---|---|
| 2,697,908 | Offner | Dec. 28, 1954 |
| 2,714,702 | Schockley | Aug. 2, 1955 |
| 2,751,545 | Chase | June 19, 1956 |
| 2,805,546 | Lawry | Sept. 10, 1957 |